Dec. 9, 1952     R. G. PIETY     2,620,658
THERMAL-ELECTRIC FLOWMETER FOR FLUID
FLOW MEASUREMENT IN BOREHOLES
Filed Aug. 9, 1948     3 Sheets-Sheet 1
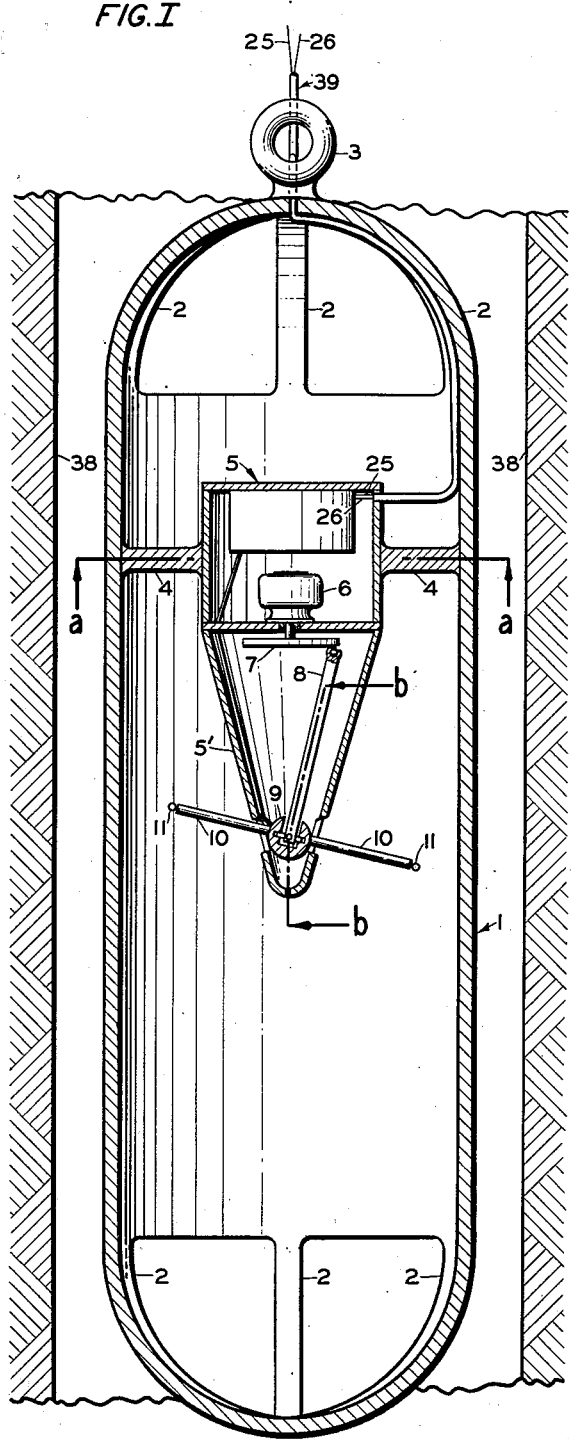
FIG. I
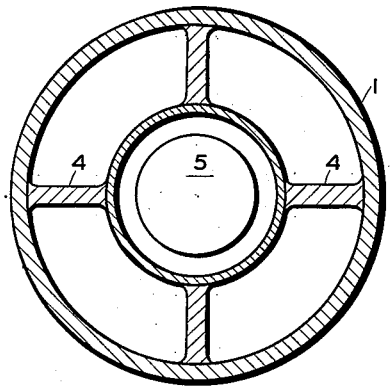
FIG. II
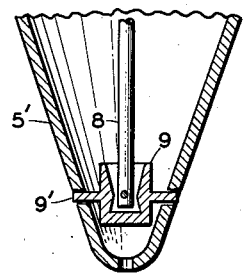
FIG. III
INVENTOR.
R. G. PIETY
BY Hudson and Young
ATTORNEYS

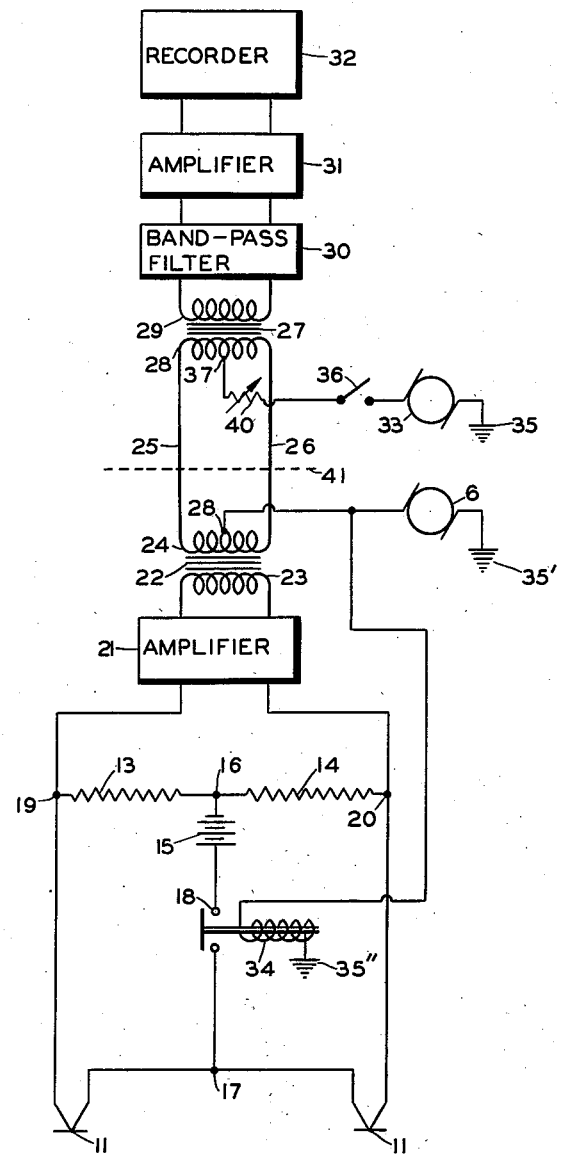

Dec. 9, 1952 R. G. PIETY 2,620,658
THERMAL-ELECTRIC FLOWMETER FOR FLUID
FLOW MEASUREMENT IN BOREHOLES
Filed Aug. 9, 1948 3 Sheets-Sheet 3
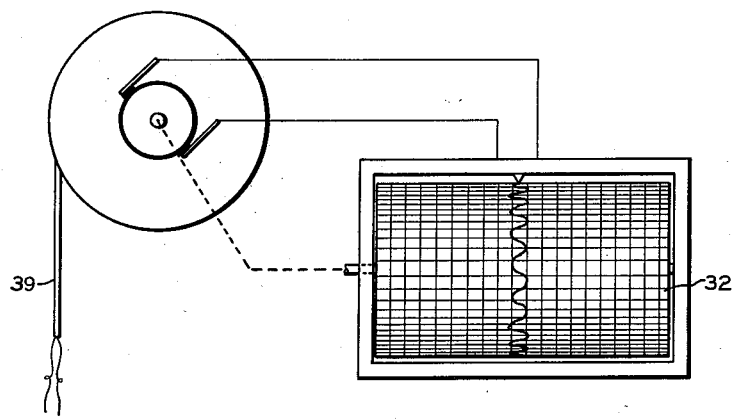
*FIG. V.*
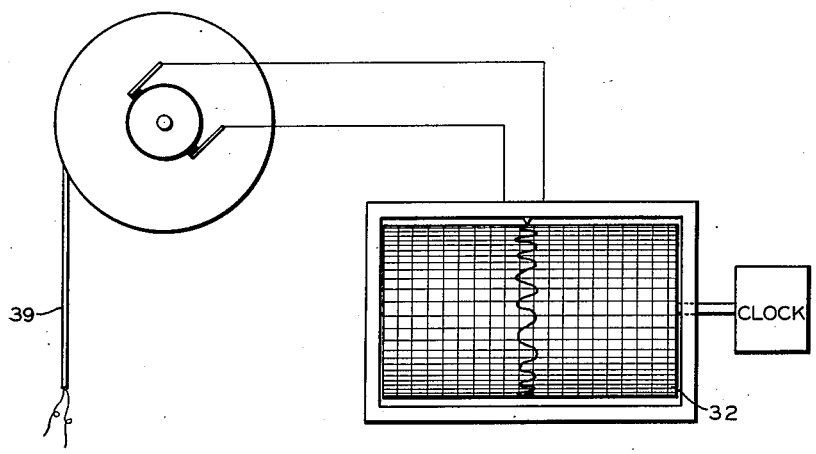
*FIG. VI.*
INVENTOR.
R. G. PIETY
BY *Hudson + Young*
ATTORNEY Patented Dec. 9, 1952

2,620,658

UNITED STATES PATENT OFFICE 2,620,658

THERMAL-ELECTRIC FLOWMETER FOR FLUID FLOW MEASUREMENT IN BOREHOLES

Raymond G. Piety, Bartlesville, Okla., assignor to Phillips Petroleum Company, a corporation of Delaware Application August 9, 1948, Serial No. 43,192

18 Claims. (Cl. 73—155)

This invention relates to a flow meter. In one embodiment it relates to a thermal-electric flow meter. In a more specific embodiment this invention relates to a highly sensitive and accurate thermal-electric flow meter for use in well holes.

An object of this invention is to provide a thermal-electric flow meter.

Another object is to provide a highly sensitive thermal-electric flow meter capable of measuring flow rates of fluids over a wide range, extending from very low to very high rates of flow.

Another object of this invention is to provide a highly sensitive and accurate thermal-electric flow meter suitable for use in drill holes.

Another object is to provide an improved flow meter which compensates for ambient temperature.

Still another object is to provide a thermal-electric flow meter which makes use of the relative movement of a fluid and temperature sensitive elements for determining rate of fluid flow.

Still another object is to provide a flow meter which will measure rate of flow upwardly or downwardly in a drill hole.

Still another object is to provide a simple and economical flow meter.

Other objects and advantages of this invention will be obvious to one skilled in the art from the accompanying discussion and disclosure.

This invention makes use of two oscillating thermal-electric sensing elements, such as bolometers, Thermistors or the like, which oscillate 180° out of phase. These thermal-electric sensing elements are temperature sensitive devices which make use of change of resistance in measuring temperature change. The thermal-electric elements are mounted such that a motor enclosed in the apparatus causes their oscillation up and down 180° out of phase. By using oscillating bolometers, for example, in a fluid, say flowing out of a drill hole, one bolometer will travel with the flow while the other will travel against the flow. The bolometer traveling against the flow will be cooled more than the one traveling with the flow, thus setting up a current flow in the bolometers inversely proportional to the difference in the resistance of the two bolometers. This difference will be zero in a still fluid but for a moving fluid there will be a periodic unbalance of the resistances, thereby generating an alternating current which can be amplified and recorded on suitable meters or the like showing fluid flow. The current will alternate with a frequency the same as that of the oscillation of the bolometers. By calibrating the rate of flow of fluid with the alternating current, the necessity for carefully balancing the bolometer resistances or compensating for ambient temperature is eliminated. A second pair of the thermal-electric sensing elements spaced a distance from the first can be used to measure the change in flow rates.

Figure I is a cross-sectional view in elevation of the thermal-electric flow meter.

Figure II is a cross-sectional view of Figure I taken along the line a—a.

Figure III is a cross-sectional view of the gimbal of Figure I taken along the line b—b.

Figure IV is a view of an electrical wiring diagram suitable for carrying out the invention.

Figure V is a view of the recorder adapted to indicate the depth at which the flow meter is operating.

Figure VI is a view of the recorder modified to indicate the variation of flow with time at any depth.

In Figure I, numeral 1 denotes a cylindrical tube which makes up the framework for this flow meter. To the ends of 1 are attached guards 2 which provide a means for preventing damage to the flow meter in the drill hole. Eyelet 3 provides a means for attachment of cable 39 to the flow meter. Insulated electrical conductors 25, 26 pass through eyelet 3 and cable 39. Cable 39 provides a means for lowering the flow meter from the surface into drill hole 38. Inside of the tube 1 are found the flow measuring elements and mechanism. Immediately inside of tube 1 are a plurality of supports 4 which mount the flow meter oscillating mechanism, transformer, motor, amplifier, and the elements necessary to operate the flow meter of this invention, as will be explained later, contained in water-tight cylindrical housing 5. Electrical wires 25—26 from the surface are connected into housing 5. Electrical motor 6, contained in housing 5, provides a means for oscillating the flow sensing elements of this flow meter. Motor 6 rotates wheel 7 which moves rotary element 8 causing gimbal 9 to give up and down movement to arms 10 which support the temperature sensing elements 11. The temperature sensing elements 11 are mounted on arms 10, as can be seen from Figures I and III. The conical shaped support 5' is securely mounted on the lower side of housing 5, and provides a means of supporting bearings 9' which permit the gimbal 9 to oscillate arms 10 and temperature sensing elements 11, due to the rotation of wheel 7. The temperature sensing elements 11 are identical and may be either the bolometer type or the Thermistor type, or any other type of suitable thermal-electric elements.

Bolometers are usually made of fine platinum wire and have a positive temperature characteristic. When bolometers are used in the type of flow meter described herein, movement of one bolometer in the opposite direction of the flow will tend to cool that bolometer, thus decreasing its electrical resistance and permitting, in turn, current to flow through it to a suitable measuring means at the surface. At the time the first bolometer moves against the flow of fluid the second bolometer moves with the flow of the fluid, the effect being to decrease the temperature less in the second bolometer than in the first, and thus causing an increased electrical resistance in this element. It can be seen that should these two bolometer elements be arranged in the opposing arms of a Wheatstone bridge circuit that the bolometer being cooled (that is, the one moving against the fluid flow) will have its electrical resistance reduced, permitting current flow to increase in that arm of the bridge circuit. By causing the bolometer elements to oscillate back and forth in the fluid an alternating current is produced, due to the alternate increase and decrease of current flow in the two thermal-electric elements when connected in a Wheatstone bridge circuit as shown in Figure IV.

Since the effect of temperature is the same on both thermal-electric elements and the same amount of fluid flows past each element, the following mathematical equation may be readily deduced: Assume that the velocity of fluid movement is V feet per second, and the movement of the thermal-electric elements $v$ feet per second (for small angles, $v$ may be assumed to be a vertical up and down velocity) it can be shown that $$C_1 = K(V-v)$$

and $$C_2 = K(V+v)$$

where $C_1$ refers to the cooling effect of the thermal-electric element moving with the fluid and $C_2$ the cooling effect of the opposite element moving against the fluid, and K, the thermal conductivity of the fluid, is a constant. When the $V=v$ then $C_1=0$ and $C_2=2KV$, which means that when the fluid is moving at the same velocity as the thermal-electric elements, the resistance in that element, moving against the fluid flow, will be directly proportional to the temperature change of that element, while the resistance of the element moving with the flow will be unaffected. Other mathematical deductions can be deduced for the conditions $V>v$ and $V<v$.

The temperature sensing element, denoted as 11, may be of the Thermistor type. Thermistor sensing elements have a negative temperature characteristic, which means that as the temperature is increased the resistance to flow of current decreases. When Thermistors are used in the flow meter described here, and caused to oscillate as before, the cooling effect in one Thermistor, due to its motion in the opposite direction of flow, gives a cooling effect, thus increasing the resistance and permitting a decreased amount of current to flow in that element. The Thermistor in the opposite arm of the flow meter will be effected conversely as it moves in the opposite direction. As in the case of the bolometer mentioned above, when the two Thermistor elements are arranged in the opposing arms of a Wheatstone bridge circuit that Thermistor being cooled will have its electrical resistance increased causing current flow to decrease in that arm. By causing the Thermistor elements to oscillate back and forth, as described above, an alternating current is produced, which is 180° out of phase as compared to the same electrical system using bolometers.

Figure IV of the drawing is a schematic wiring diagram of a suitable circuit which may be used to carry out this invention. The sensing elements 11 are located in the two arms of a Wheatstone bridge circuit. Resistances 13 and 14 are opposite the sensing elements 11 in the Wheatstone bridge. Direct current is supplied across the bridge to points 16 and 17 by means of battery 15. Solenoid operated switch 18, which will be described later, is used for turning on and off the current to the Wheatstone bridge. Points 19 and 20 of the bridge are connected to a down hole amplifier 21 which amplifies an alternating current produced due to the oscillation of the temperature sensing elements 11. It is obvious to one skilled in the art that an alternating current will be produced if the resistance of elements 11 is varied alternately, due to the alternate increase and decrease in the temperature of these elements. The output of amplifier 21 is impressed on the primary winding 23 of transformer 22. The secondary winding 24 of transformer 22 is connected through leads 25 and 26 contained in the cable 39 which supports the flow meter. Leads 25 and 26 are connected to primary coil 28 of transformer 27 on the surface of the earth. All of the electrical equipment above dotted line 41 is used on the ground surface, while all of the electrical squipment below 41 is used in the drill hole. The secondary winding 29 of transformer 27 is connected through a band-pass filter 30 and an amplifier 31 before it reaches a suitable recording instrument 32. The recording instrument may record in barrels per hour, barrels per day, or the like. A tape placed on the recorder may be made to indicate depth at which the flow meter is operating as illustrated in Figure V of the drawing. In a modification of the recorder the tape may be operated by clock as illustrated in Figure VI of the drawing, in which event flow variation with time can be recorded for any depth. In this particular circuit, amplifier 21, transformer 22, transformer 27 and amplifier 31 are used to amplify the low level alternating potential produced as a result of variations in the resistance of the flow sensing elements. Any suitable recording or indicating instrument may be used at the surface to indicate the flow of fluid through the meter.

An alternating current source 33 at the surface is provided to operate the motor 6, and solenoid 34 which controls switch 18. Alternating current from source 33 is impressed between ground 35 and switch 36 through variable resistance 40 to the center tap 37 of transformer 27 for transmission to the motor 6 and solenoid 34 in the flow meter. Alternating current for motor 6 is taken from transformer 22 at center tap 28 through motor 6 to ground 35'. The lead to solenoid 34 is also connected to the center tap 28 of the transformer 22. Solenoid 34 is grounded at 35''. From the wiring diagram it can be seen that when switch 36 at the surface is closed alternating current from source 33 will start motor 6 to operating, and cause switch 18 to close which connects battery 15 into the Wheatstone bridge circuit, thus permitting the flow meter to operate.

The band-pass filter 30, mentioned before, is used to prevent alternating current from being amplified and mixed with the flow rate signal coming from the flow meter. The wiring diagram disclosed here furnishes a means for carrying out this invention. Other circuit diagrams may be used for carrying out this invention as will be apparent to those skilled in the art.

In the operation of this flow meter, it is lowered into the drill hole 38 by means of cable 39 which contains the two insulated conducting wires 25 and 26. The depth to which the flow meter is lowered may be indicated on recorder 32. After the flow meter has been lowered to the depth at which the flow rates are to be determined switch 36 is closed, supply alternating current to motor 6 and solenoid 34. Motor 6 starts oscillating the thermal-electric sensing elements and solenoid 34 closes switch 18, permitting direct current to flow in the Wheatstone bridge containing the thermal electric elements. Since the flow in an oil well is usually slow it will only be necessary that the thermal-electric elements oscillate only from approximately 0.1 to 1.0 cycle per second, the rate of oscillation being determined by variable resistance 40. The rate of flow at any particular depth is recorded on the chart of the recorder 32. After the flow rate has been determined at one level, switch 36 may be opened and the flow meter lowered to another level at which the flow rate will be determined as described above. By obtaining the flow rates at different levels in drill hole 38 one is able to determine the exact location of producing strata.

Another obvious application of the flow meter is in water-input wells found in connection with secondary recovery programs. When this flow meter is used in input wells it can be used to check water input periodically, since it is only necessary to close the switch supplying the alternate current to set the flow meter in operation. This feature will not necessitate the insertion and removal of the flow meter each time it is desired to test flow rates. This flow meter may also be used in determining gas flow to and from gas formations at different depth. In this case, it is possible to determine the exact location where gas is entering the drill hole by placing the flow meter to different depths. It is obvious that the flow meter of this invention may also be used to obtain flow rates in oil lines, water lines, gas lines, etc. It is entirely possible to use two sets of thermal-electric elements in tandem arrangements in this flow meter, spaced a distance apart to measure flow at different levels in the drill hole.

In the operation of the flow meter it is apparent that the ambient temperature of the flowing fluid affects both thermal-electric elements by exactly the same amount, and therefore, the effects are balanced out, and thus will not affect its flow measuring ability.

While a preferred form of apparatus has been described, it is to be understood that this is by way of illustration only and various changes and modifications may be made without departing from the spirit of the invention.

What is claimed is:

1. A thermo-electric flow meter for measuring rate of fluid flow which comprises, in combination, an electrically balanced circuit, a thermal-electric sensing element connected in said circuit, means for alternately moving said element countercurrently and concurrently in said fluid flow thereby unbalancing said circuit and generating therein an alternating current which is a function of the rate of fluid flow, and means for measuring said generated current.

2. A thermal-electric flow meter for measuring rate of fluid flow which comprises, in combination, an electrically balanced circuit, thermal-electric sensing elements connected in said circuit and disposed in said fluid flow, means for alternately moving at least one of said elements countercurrently and concurrently thereby unbalancing said circuit and generating therein an alternating current which is a function of the rate of fluid flow, and means for measuring said generated current.

3. A thermal-electric flow meter for measuring rate for fluid flow which comprises, in combination, an electrically balanced circuit, thermal-electric sensing elements connected in said circuit, means for causing at least two of said elements to move alternately concurrently and countercurrently in and to said fluid flow but out of phase with each other thereby unbalancing said circuit and generating therein an alternating current which is a function of the rate of fluid flow, and means for measuring said generated current.

4. A thermal-electric flow meter for measuring rate of fluid flow which comprises, in combination an electrically balanced circuit, thermal-electric sensing elements connected in said circuit, means for moving said elements to and fro in opposite directions simultaneously with respect to each other and alternately concurrently and countercurrently in said fluid flow thereby unbalancing said circuit and generating therein an alternating current which is a function of the rate of fluid flow, and means for measuring said generated current.

5. A thermal-electric flow meter for measuring rate of fluid flow which comprises, in combination, an electrically balanced circuit, thermal-electric sensing elements connected in said circuit, means for oscillating said elements countercurrently and concurrently simultaneously in said fluid flow thereby unbalancing said circuit and generating therein an alternating current which is a function of the rate of fluid flow, and means for measuring said generated current.

6. A thermal-electric flow meter for measuring rate of fluid flow which comprises, in combination, a Wheatstone bridge circuit, thermal-electric sensing elements connected in said circuit, means for moving said elements to and fro in opposite directions simultaneously with respect to each other and alternately concurrently and countercurrently in said fluid flow thereby unbalancing said bridge circuit and generating therein an alternating current which is a function of the rate of fluid flow, and means for measuring said generated current.

7. A thermal-electric flow meter for measuring rate of fluid flow which comprises, in combination, a housing with openings at both ends to allow fluid flow therethrough, a Wheatstone bridge circuit, thermal-electric sensing elements connected in adjacent arms of said bridge circuit, means for supporting and spacing said elements, means for moving said supporting means and concomitantly oscillating said elements countercurrently and concurrently simultaneously in said fluid flow thereby generating in said bridge circuit an alternating current which is a function of the rate of fluid flow, means for supporting said moving means in said housing, and means for measuring said generated current.

8. A thermal-electric flow meter for measuring rate of flow which comprises, in combination, a housing with openings at both ends to allow fluid flow therethrough, an electrically balanced circuit, thermal-electric sensing elements connected in said circuit, means for supporting and spacing said elements, means for moving said supporting means and concomitantly oscillating said elements countercurrently and concurrently simultaneously in said fluid flow thereby generating in said circuit and alternating current which is a function of the rate of fluid flow, means for supporting said moving means in said housing, and means for measuring and recording the rate of fluid flow in response to the generated alternating current.

9. A flow meter according to claim 8 wherein the thermal-electric sensing elements are bolometers.

10. A flow meter according to claim 8 wherein the thermal-electric sensing elements are Thermistors.

11. A thermal-electric flow meter for determining rate of fluid flow which comprises, in combination, a housing with openings at both ends to allow fluid flow therethrough, an electrically balanced circuit, an equal even number of thermal-electric sensing elements connected in said circuit, an arm mounted in said housing and having said elements disposed at opposite ends thereof, means for moving said arm and concomitantly oscillating said elements countercurrently and concurrently simultaneously in said fluid flow thereby generating an alternating current in said circuit which is a function of the rate of fluid flow, means for supporting said moving means in said housing, means for controlling the rate of oscillation, and means for measuring and recording the rate of fluid flow in response to the generated alternating current.

12. A thermal-electric flow meter for determining rate of fluid flow which comprises, in combination, a housing with openings at both ends to allow fluid flow therethrough, an electrically balanced circuit, an even number of thermal-electric sensing elements disposed in said housing and connected in adjacent arms of said circuit, means for supporting and spacing said elements from one another, electrical means for moving said supporting means and concomitantly oscillating said elements countercurrently and concurrently simultaneously in said fluid flow thereby generating in said circuit an alternating current which is a function of the rate of flow, means for supporting said moving means in said housing, a source of direct current, a source of alternating current, means for introducing said direct current across said electrical circuit with said alternating current, said alternating current concomitantly operating said electrical moving means, and means for measuring and recording the rate of fluid flow in response to the generated alternating current.

13. A flow meter according to claim 12 wherein the electrical circuit is a Wheatstone bridge circuit and the thermal-electric sensing elements are bolometers.

14. A flow meter according to claim 12 wherein the electrical circuit is a Wheatstone bridge circuit and the thermal-electric sensing elements are Thermistors.

15. A thermal-electric flow meter for determining the rate of fluid flow in a well-hole which comprises, in combination, a housing with openings at both ends to allow fluid flow therethrough, an even number of thermal-electric sensing elements connected in an electrically balanced circuit, supporting and spacing means for said elements, said means being movably mounted in said housing, electrical means for moving said supporting means and concomitantly oscillating said elements countercurrently and concurrently simultaneously in said fluid flow whereby an alternating current which is a function of the rate of fluid flow is generated in said circuit, means for supporting said moving means in said housing, a source of alternating current at the surface to operate said electrical moving means, means for transmitting said alternating current to the electrical moving means and concomitantly transmitting said generated current to the surface, means for filtering out said alternating current used to operate said electrical moving means, means for amplifying said filtered generated current, means for translating said filtered generated current into the rate of fluid flow, and means for lowering said flow meter in said well-hole.

16. A thermal-electric flow meter for determining the rate of fluid flow in a well-hole which comprises, in combination, an outer housing with openings at both ends to allow fluid flow therethrough, an inner housing, a Wheatstone bridge circuit, thermal-electric sensing elements connected in adjacent arms of said bridge circuit, a supporting member with said elements disposed at opposite ends thereof, said supporting member being movably mounted in said outer housing and connecting with said inner housing, electrical means contained in said inner housing for moving said supporting means and concomitantly oscillating said elements concurrently and countercurrently simultaneously in said fluid flow thereby generating in said bridge circuit an alternating current which is a function of the rate of flow, a source of direct current connected across said bridge circuit, a solenoid switching means for connecting said direct current source across said bridge circuit, a source of alternating current at the surface to concomitantly operate said electrical moving means and said solenoid switching means, an amplifier contained in said inner housing connected across said bridge circuit to amplify said generated alternating current, means for transmitting said amplified generated current to the surface and concomitantly transmitting the alternating current to operate said electrical moving means and solenoid switching means, means for supporting said inner housing in said outer housing, means for filtering out of the generated current the alternating current used to operate said electrical moving means, means for amplifying said filtered generated current, means for translating said filtered generated alternating current into an indication of the rate of fluid flow, and means for lowering said outer housing into the well hole.

17. A flow meter according to claim 16 wherein the thermal-electric sensing elements are bolometers.

18. A flow meter according to claim 16 wherein the thermal-electric sensing elements are Thermistors.

RAYMOND G. PIETY.

REFERENCES CITED

The following references are of record in the file of this patent:

UNITED STATES PATENTS

| Number | Name | Date |
| --- | --- | --- |
| 1,968,534 | Megow | July 31, 1934 |
| 2,414,862 | Fearon | Jan. 28, 1947 |